（12）United States Patent
Graf et al.

(10) Patent No.: US 7,292,687 B2
(45) Date of Patent: Nov. 6, 2007

(54) CAPABILITY NEGOTIATION IN A TELECOMMUNICATIONS NETWORK

(75) Inventors: Leslie Graf, Melbourne (AU); Paul Hollis, Nth Ringwood (AU); David De Nicolo, West Essendon (AU); Christian Groves, Keilor (AU); Ian Rytina, Stockholm (SE); Juan Noguera-Rodriguez, Essendon (AU); Mark Hollis, Park Orchards (AU); Nebosja Dikic, North Melbourne (AU); Stephen Terrill, Stockholm (SE); Sune Ramström, Sundsvall (SE); Lars Kari, Stockholm (SE); Barry Dingle, Croydon (AU)

(73) Assignee: Telefoektiebolaget LM Ericsson (publ), Stockholm (SE)

( * ) Notice: Subject to any disclaimer, the term of this patent is extended or adjusted under 35 U.S.C. 154(b) by 661 days.

(21) Appl. No.: 10/686,226

(22) Filed: Oct. 15, 2003

(65) Prior Publication Data

US 2004/0101125 A1 May 27, 2004

Related U.S. Application Data

(62) Division of application No. 09/573,500, filed on May 16, 2000, now Pat. No. 6,671,367.

(30) Foreign Application Priority Data

| May 17, 1999 | (GB) | ................................. 9911441.5 |
| Jun. 22, 1999 | (GB) | ................................. 9914654.0 |
| Jun. 29, 1999 | (GB) | ................................. 9914700.1 |
| Jul. 2, 1999 | (GB) | ................................. 9915366.0 |
| Sep. 15, 1999 | (GB) | ................................. 9921647.5 |

(51) Int. Cl.
*H04M 7/00* (2006.01)

(52) U.S. Cl. ............ 379/219; 379/220.01; 379/221.07; 379/221.08; 379/224; 379/258; 370/373; 370/377; 370/384; 370/385; 370/522; 370/524

(58) Field of Classification Search ................ 379/219, 379/220.01, 221.07, 221.08, 224, 258; 370/385, 370/522, 524, 373, 377, 384
See application file for complete search history.

(56) References Cited

U.S. PATENT DOCUMENTS 6,567,398 B1 * 5/2003 Aravamudan et al. ...... 370/352

* cited by examiner

*Primary Examiner*—Quynh H. Nguyen
(74) *Attorney, Agent, or Firm*—Michael Cameron

(57) ABSTRACT

A method of negotiating a call capability between signalling points in a telecommunications system. The method comprises sending a capability preference or prioritised list of preferences from an originating signalling point to a terminating signalling point or signalling transfer point, at the Call Control level. A capability acceptance is returned from the terminating signalling point or signalling transfer point to the originating signalling point at the Call Control level, if the terminating signalling point or signalling transfer point accepts a preference sent by the originating signalling point.

7 Claims, 10 Drawing Sheets

CAPABILITY NEGOTIATION IN A TELECOMMUNICATIONS NETWORK

This application is a divisional application of U.S. patent application Ser. No. 09/573,500 filed on May 16, 2000 now U.S. Pat. No. 6,671,367, which claims priority from United Kingdom patent application number 9911441.5 filed on May 17, 1999, United Kingdom patent. application number 9914654.0 filed on Jun. 22, 1999, United Kingdom patent application number 9914700.1 filed on Jun. 23, 1999, United Kingdom patent application number 9915366.0 filed on Jul. 2, 1999 and United Kingdom patent application number 9921647.5 filed on Sep. 15, 1999, the disclosures of which are incorporated herein by reference.

FIELD OF THE INVENTION

The present invention relates to capability negotiation in a telecommunications network and in particular, though not necessarily, to the negotiation of a suitable speech codec.

BACKGROUND TO THE INVENTION

Telecommunications networks currently rely to a large extent upon the Signalling System no.7 (SS7) as the mechanism for controlling call connections and for handling the transfer of signalling information between signalling points of the networks. Typically, one or more application and user parts at a given signalling point will make use of SS7 to communicate with peer application and user parts at some other signalling point. Examples of user parts are ISUP (ISDN User Part) and TUP (Telephony User Part) whilst examples of application parts are INAP (Intelligent Network Application Part) and MAP (Mobile Application Part). The conventional SS7 protocol stack includes Message Transfer Parts MTP1, MTP2, and MTP3 which handle the formatting of signalling messages for transport over the physical layer as well as various routing functions.

There has been considerable interest of late amongst the telecommunications community in using non-standard (i.e. non-conventional within the telecommunications industry) signalling transport mechanisms in telecommunications networks in place of the conventional SS7 mechanisms. The reasons for this are related both to improvements in efficiency as well as potential cost savings. Much consideration has been given for example to the use of Internet Protocol (IP) networks to transport signalling information between signalling points. IP networks have the advantage that they make efficient use of transmission resources by using packet switching and are relatively low in cost due to the widespread use of the technology (as opposed to specialised telecommunication technology). There is also interest in using other transport mechanisms including AAL1/2/5, FR etc.

The ISUP standard which deals with the setting-up and control of call connections in a telecommunications network is closely linked to the SS7 signalling transport mechanism and does not readily lend itself to use with other non-standard transport technologies such as IP and AAL2. As such, several standardisation bodies including the ITU-T, ETSI, and ANSI, are currently considering the specification of a signalling protocol for the control of calls, which is independent of the underlying transport mechanism. This can be viewed as separating out from the protocol, Bearer Control functions which relate merely to establishing the parameters (including the start and end points) of the "pipe" via which user plane data is transported between nodes, and which are specific to the transport mechanism. The new protocol, referred to as Transport Independent Call Control (TICC), retains Call Control functions such as the services invoked for a call between given calling and called parties (e.g. call forwarding), and the overall routing of user plane data.

The new network architecture resulting from the separation of the call and Bearer Control levels results in an open interface appearing between a Call Control entity and a Bearer Control entity, where these entities are referred to as a Media Gateway Controller and a Media Gateway respectively. The open interface is referred to hereinafter as X-CP, examples of which are the MEGACO work of the IETF and the H.248 work of ITU Study Group 16 (SG16).

Traditionally, fixed telephone networks make use of Pulse Code Modulation to transport user plane data, e.g. voice, facsimile, etc, between network nodes. Modern cellular networks on the other hand often use one or more coders/decoders (referred to as "codecs") to compress voice signals for efficient transmission across the air interface and within the cellular networks themselves. Where a telephone call connection extends between two networks (or terminals) which support different or multiple speech codecs, a negotiation may be carried out between the terminals to decide upon an appropriate codec. If this negotiation is not carried out, the result may be a requirement for transcoding at the interface between the networks, i.e. conversion from one form of speech coding to another. Transcoding is expensive in terms of resources, significantly degrades speech quality, and introduces a processing time delay. Codec negotiation is therefore the preferred option.

In addition to codec negotiation, there is often a need in conventional telecommunications networks to negotiate other functionality and parameters. For example, it may be desirable to negotiate security capabilities such as voice ciphering and data encryption between terminals or nodes in telecommunications networks.

SUMMARY OF THE PRESENT INVENTION

According to a first aspect of the present invention there is provided a method of negotiating a call capability between signalling points in a telecommunications system, the method comprising:
  sending a capability preference or prioritised list of preferences from an originating signalling point to a terminating signalling point or signalling transfer point, at the Call Control level; and
  returning a capability acceptance from the terminating signalling point or signalling transfer point to the originating signalling point at the Call Control level, if the terminating signalling point or signalling transfer point accepts a preference sent by the originating signalling point.

It will be appreciated that in some cases, e.g. where the terminating signalling point or signalling transfer point does not accept a capability preference (or one of a list of preferences) sent by the originating signalling point, no acceptance message may be returned in which case a default capability is assumed by both points. Alternatively, a default message may be returned indicating that the default codec is to be used. If no codec can be agreed upon, then in certain situations a call may be released due to network incompatibility.

The present invention is particularly suited to negotiating speech codec capabilities between signalling transfer points located in different telecommunications networks. For example, in Japanese telecommunications networks, the invention may be used to negotiate the use of one of VSELP, PSI-CELP, or μ-law coding, where μ-law coding is the default coding. However, the invention is also applicable to negotiating other capabilities including security capabilities (e.g. voice ciphering and data encryption).

The protocol used to conduct the negotiation may be TICC, or may be a specific protocol also employed at the CC level, i.e. a User Plane Capability Negotiation protocol.

Where the Call Control and Bearer Control levels are controlled by separate protocols, a signalling point reacts to the selection of a capability at the Call Control level by notifying the Bearer Control level, if the selection affects the bearer level. If appropriate, notifications may be subsequently sent at the bearer level between bearer switching points to enable the establishment of appropriate bearer level resources.

Preferably, the signalling point or signalling transfer point is a Media Gateway Controller. More preferably, the Media Gateway Controller communicates with one or more Media Gateways which exist at the Bearer Control level.

Despite the fact that certain options supported for a capability at the Bearer Control level may be known at the Call Control level, the Call Control level will not necessarily know the current availability of those options at the Bearer Control level. Preferably therefore, upon receipt of a capability preference or prioritised list of preferences at a terminating signalling point or signalling transfer point, the Call Control level conducts a negotiation with the Bearer Control level to determine option availability at the Bearer Control level. More preferably, this negotiation occurs between a Media Gateway Controller of the Call Control level and a Media Gateway of the Bearer Control level.

Where a prioritised list of preferences is sent from an originating signalling point to a Media Gateway Controller, the Controller preferably modifies the list to remove preferences which it knows are not supported by the associated Media Gateway. The Controller then sends the modified list to the Media Gateway which selects the preference with the highest priority which the Media Gateway can support at that time. The Gateway may then reserve the resources necessary for that preference and advises the Media Gateway Controller of the preference. The Media Gateway Controller may then return a capability acceptance to the originating Media Gateway Controller.

According to a second aspect of the present invention there is provided a signalling point arranged to negotiate a call capability with another signalling point in a telecommunications system, the method comprising:

means for sending a capability preference or prioritised list of preferences to a terminating signalling point or signalling transfer point, at the Call Control level; and means for receiving a capability acceptance from the terminating signalling point or signalling transfer point at the Call Control level, which capability acceptance is sent if the terminating signalling point or signalling transfer point accepts a preference sent by the originating signalling point.

According to a third aspect of the present invention there is provided a Media Gateway Controller of a telecommunications system, the Media Gateway Controller comprising:

means for receiving a capability preference or prioritised list of preferences from a peer Media Gateway Controller, where said capability preference or prioritised list of preferences relate to a connection to be set-up over the telecommunications system;

means for communicating with a Media Gateway associated with the Media Gateway Controller to determine the availability of the received preference(s) at the Media Gateway; and means for returning a capability preference acceptance message to said peer Media Gateway Controller in dependence upon the determined availability at the Media Gateway.

According to a fourth aspect of the present invention there is provided a Media Gateway of a telecommunications system, the Gateway comprising:

means for receiving a capability preference or prioritised list of preferences from a Media Gateway Controller, wherein said capability preference or prioritised list of preferences relate to a connection to be set-up over the telecommunications system;

means for selecting a preference on the basis of the availability of the preferences at the Media Gateway; and means for sending the selected preference to said Media Gateway Controller.

According to a fifth aspect of the invention there is provided a method of negotiating protocol options between first, second and third nodes in a telecommunications network using separated call control and bearer control protocols, the method comprising:

transmitting a first call control message from the first node to the second node specifying protocol options supported by the first node;

transmitting a second call control message from the second node to the third node specifying protocol options supported by both the first and second nodes; and selecting a protocol option from the protocol options specified in the second control message.

Said step of selecting a protocol option from the protocol options specified in the second control message may be carried out by the third node.

Each said call control message may include a preference level associated with each specified protocol option.

The first node may be an originating node. The third node may be a terminating node.

The method may further include a step of determining whether the bearer level between the first and second nodes is affected by said selecting step, and if the bearer level is affected taking action to modify the parameters of the bearer level between the first and second nodes.

The method may also include determining whether the bearer level between the second and third nodes is affected by said selecting step, and if the bearer level is affected taking action to modify the parameters of the bearer level between the second and third nodes.

According to a sixth aspect of the present invention there is provided a method of setting-up a speech call connection in a telecommunications system where the Call Control protocol is independent of the bearer transport mechanism, the method comprising:

negotiating a first speech codec between an originating signalling point of the system and a first terminating signalling point;

establishing a call connection over the transport mechanism between the originating signalling point and said first terminating signalling point in dependence upon said first speech codec;

subsequently negotiating a second, different speech codec between said first terminating signalling point and a second, new terminating signalling point;

notifying the originating signalling point of the second speech codec; and establishing a call connection between the originating signalling point and said second terminating signalling point wherein said first originating signalling point acts as an intermediate signalling point and wherein the first mentioned call connection is modified if necessary to support said second speech codec.

It will be appreciated that embodiments of the present invention enable the smooth transfer of a call connection between different terminating signalling points, by modifying the connection between the originating signalling point and the original terminating signalling point to reflect the new codec. The final end-to-end connection is completed by establishing a connection between the original terminating signalling point and the new terminating signalling point based upon the new codec. Preferably, this latter connection is established after the first connection is modified, although this need not be the case.

It will also be appreciated that the method of the present invention is only applicable when the speech codec negotiation between the original terminating signalling point and the final terminating signalling point does not result in the first speech codec. If the result is the first speech codec, then there may be no need to modify the original connection.

Preferably, the step of notifying the originating signalling point of the second speech codec comprises sending an appropriate Call Control (CC) message from the original terminating signalling point to the originating signalling point. This CC message may be a Modify request message.

Preferably, the Call Control protocol is a Transport Independent Call Control (TICC) protocol.

The present invention is applicable to the evolution of existing telecommunication network such as mobile networks based on GSM, DAMPS, PDC, etc, as well as to future generation networks such as UMTS.

According to a seventh aspect of the present invention there is provided a telecommunications system in which the Call Control protocol is independent of the bearer transport mechanism, the system comprising:

means for negotiating a first speech codec between an originating signalling point of the system and a first terminating signalling point;

means for establishing a call connection over the transport mechanism between the originating signalling point and said first terminating signalling point in dependence upon said first speech codec;

means for subsequently negotiating a second, different speech codec between said first terminating signalling point and a second, new terminating signalling point;

means for notifying the originating signalling point of the second speech codec; and means for establishing a call connection between the originating signalling point and said second terminating signalling point wherein said first originating signalling point acts as an intermediate signalling point and wherein the first mentioned call connection is modified if necessary to support said second speech codec.

According to an eighth aspect of the present invention there is provided a signalling point of a telecommunications network in which the Call Control protocol is independent of the bearer transport mechanism, the signalling point comprising:

processing means for negotiating a first speech codec with a first terminating signalling point;

means for establishing a call connection over the transport mechanism between the originating signalling point and said first terminating signalling point in dependence upon said first speech codec;

means for receiving a notification of a second speech codec which has been negotiated between said first terminating signalling point and a second, new terminating signalling point; and means for modifying the first mentioned call connection if necessary to support said second speech codec.

According to a ninth aspect of the present invention there is provided a method of setting up a call connection between first and second mobile telephone networks at least one of which comprises a Tandem Free Operation (TFO) device located outside of the Radio Access Network part(s) of the mobile network and in which the Call Control protocol is independent of the bearer transport mechanism, the method comprising the steps of:

conducting a negotiation between said TFO device of one of the mobile networks and a peer TFO device of the other mobile network to determine a suitable speech codec; and notifying said Radio Access Network of the determined speech codec by sending a Call Control (CC) message from the associated TFO device.

It may be the case that each of the mobile networks comprises a Tandem Free Operation (TFO) device located outside of the Radio Access network part(s) of the mobile network. However, this need not be the case; and one of the mobile networks may have a TFO device within the radio Access Network.

The two mobile telephone networks may be coupled to one another via a PSTN. Preferably, said negotiation is carried out using the Codec Mismatch Resolution and Optimisation Procedure in the TFO protocol, with TFO messages being sent using in-band signalling.

Preferably, said the or each TFO device located outside of a Radio Access network is located at a Gateway MSC (GMSC) which provides an interface between the mobile network and foreign networks, e.g. a PSTN.

The present invention is particularly suited to setting up a call connection between subscribers, one of whom is a subscriber of a Universal Mobile Telecommunication System (UMTS) network. In this case, the Radio Access Network is preferably a UMTS Terrestrial Radio Access Network (UTRAN), with the TFO device of the network being located on the edge of the UMTS core network.

According to an tenth aspect of the present invention there is provided apparatus for setting up a call connection between first and second mobile telephone networks at least one of which comprises a Tandem Free Operation (TFO) device located outside of the Radio Access Network part(s) of the mobile network and in which the Call Control protocol is independent of the bearer transport mechanism, the apparatus comprising:

means for conducting a negotiation between said TFO device of one of the mobile networks and a peer TFO device of the other mobile network to determine a suitable speech codec; and means for notifying said Radio Access Network of the determined speech codec by sending a Call Control (CC) message from the associated TFO device.

According to a eleventh aspect of the present invention there is provided a method of setting up a call connection between first and second mobile telephone networks each of which comprises a Tandem Free Operation (TFO) device located outside of the Radio Access Network part(s) of the mobile network and in which the Call Control protocol is independent of the bearer transport mechanism, the mobile networks being coupled via a Public Switched Telephone Network (PSTN), the method comprising the step of:

conducting a negotiation between two mobile terminals subscribing to the first and second mobile networks respectively to determine a suitable speech codec, wherein the negotiation is conducted using Call Control protocol signalling messages exchanged between the Radio Access Network parts and the respective TFO devices, and ISUP messages sent between the TFO devices.

For example, a list of codecs which are available to an originating mobile network may be sent from the TFO device of that network to the peer TFO device using an ISUP Initial Address Message (IAM). The message may additionally include the codec preferred by the originating mobile network. A subsequent ISUP message sent in the backward direction will indicate the codec type selected by the terminating mobile terminal. In order to enable this negotiation procedure, it may be necessary to modify the ISUP standard.

According to a twelfth aspect of the present invention there is provided apparatus for setting up a call connection between first and second mobile telephone networks each of which comprises a Tandem Free Operation (TFO) device located outside of the Radio Access Network part(s) of the mobile network and in which the Call Control protocol is independent of the bearer transport mechanism, the mobile networks being coupled via a Public Switched Telephone Network (PSTN), the apparatus comprising:

means for conducting a negotiation between two mobile terminals subscribing to the first and second mobile networks respectively to determine a suitable speech codec, wherein the negotiation is conducted using Call Control protocol signalling messages exchanged between the Radio Access Network parts and the respective TFO devices, and ISUP messages sent between the TFO devices.

BRIEF DESCRIPTION OF THE DRAWINGS

FIG. 2 (case B) illustrates signalling flows between the signalling points of FIG. 1 according to a second embodiment of the invention;

DETAILED DESCRIPTION OF CERTAIN EMBODIMENTS

Figure 1:
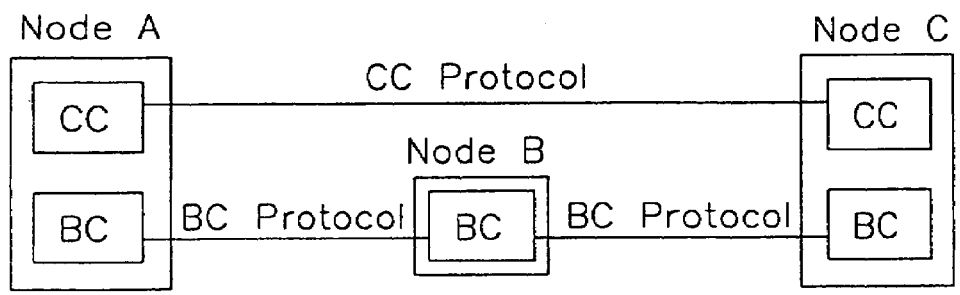
FIG. 1 illustrates a number of signalling points in a telecommunications network.

There is illustrated in FIG. 1 a portion of a telecommunications network comprising two signalling points referred to hereinafter as Nodes A and C. These nodes may be for example telephone exchanges or switches and may belong to the same network operator or to different network operators. In the present example, Node A is the originating node to which a calling party (not shown) is connected whilst Node C represents a terminating node to which a called party is connected. Each of the signalling points comprises a Call Control (CC) part and a Bearer Control (BC) part, i.e. the Call Control and Bearer Control functionalities are separated out into two distinct protocol layers. The CC parts form a Call Control level which is responsible for performing functions such as call forwarding as well as other routing and control functions. The BC parts are responsible for establishing and dimensioning pipes between BC parts for transporting user plane data.

Considering now the BC level, this comprises a bearer network which may be for example an IP network. Within the IP network there are one or more bearer switching points, although only one such point is illustrated in FIG. 1 (Node B). For the IP network, these bearer switching points will be IP routers. It will be appreciated that where the bearer network is an ATM or AAL2 network the bearer switching points would be ATM or AAL2 switches respectively.

In the event that a calling party initiates a call, e.g. by taking his telephone off-hook, the originating signalling point Node A receives at the CC level information from the source (i.e. caller) which defines the bearer resource requirements. The originating signalling point determines, on the basis of the source information and/or the capabilities of the signalling point and its home network, a list of possible options which must be negotiated with the terminating signalling point Node C.

Node A then signals the list of possible options in a message to the CC part with which it wishes to negotiate a specific capability (node C in FIG. 1). The message indicates the level of preference for each option.

Node C uses the priority levels specified by Node A for each option in the list to select the most preferred option that it supports, i.e. Node C does not choose an option if it supports another option in the list for which Node A has indicated a higher preference. Node C signals the selected option to Node A.

Figure 2:
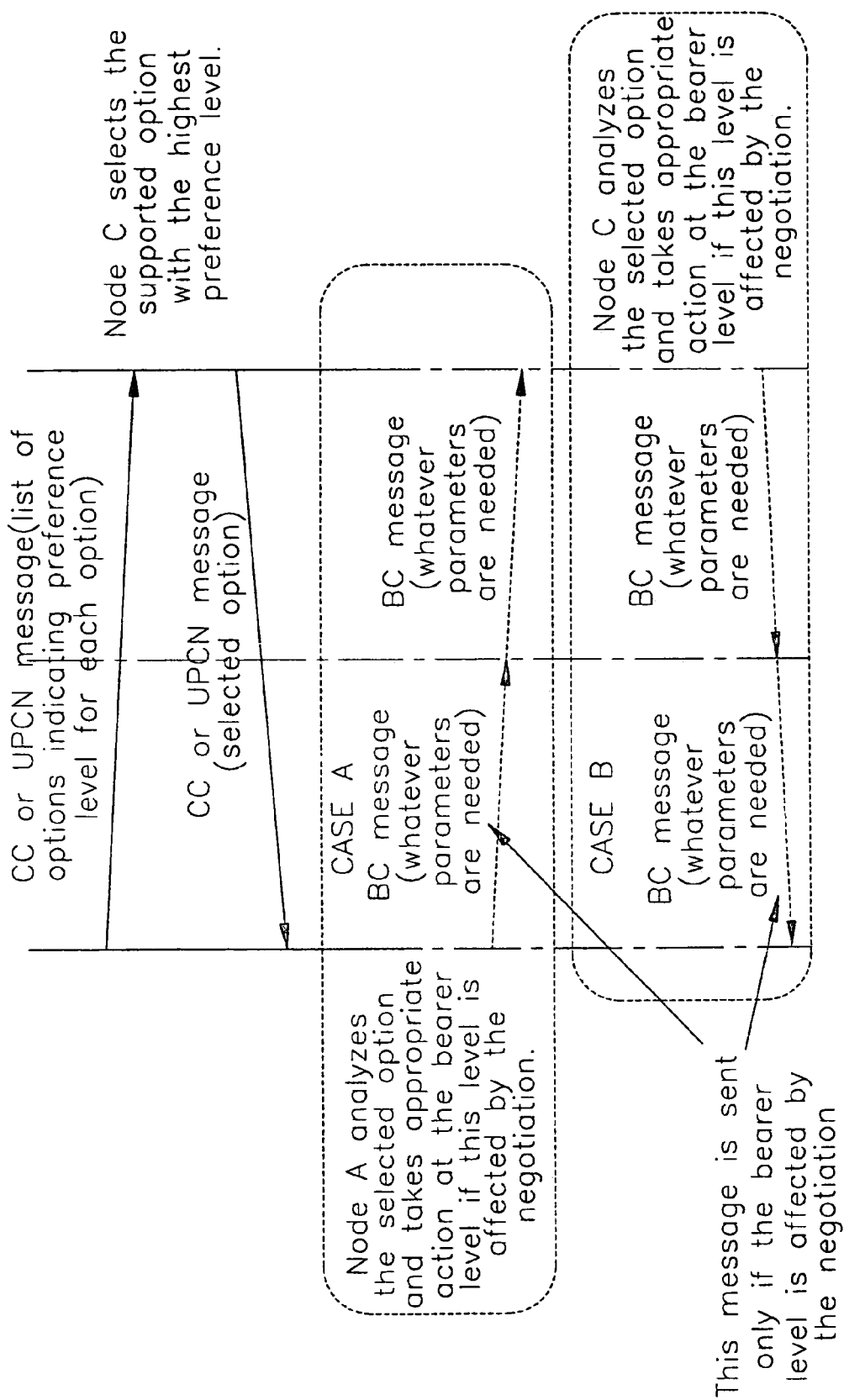
FIG. 2 (case A) illustrates signalling flows between the signalling points of FIG. 1 according to a first embodiment of the invention.

If the results of this negotiation affect the bearer connection level, appropriate actions are taken at the bearer level to adapt to the outcome of the negotiation. This is done by the BC protocol. Two cases are possible: forward bearer modification (case A in FIG. 2) or backward bearer modification (case B in FIG. 2).

An example of a capability which may be negotiated using the above method is codec capability. Generally, speech is transcoded to PCM in the radio access network because this is the only speech format allowed by traditional fixed telephone networks. However, as transcoding significantly deteriorates the speech quality, some cellular standards (e.g. GSM, PDC) specify methods to avoid transcoding when a connection is established between two compatible terminals (e.g. two GSM terminals with a common codec). Since most current mobile terminals support several codecs, these methods also implement codec negotiation but have some important drawbacks compared to the generic negotiation mechanism presented here.

Speech codecs are either tightly coupled to mobile environments (in PDC, codec negotiation is a service of the Mobile Application Part (MAP) protocol) or do not optimise the use of hardware and transmission resources (in GSM, codec negotiation is part of the Tandem Free Operation (TFO) protocol). Two transcoders (TRAUs) and a 64 Kbps channel are allocated always for a speech connection independently of whether transcoding actually happens or not). Currently, different mobile standards deal with the problem in different ways and there has previously been no possibility to harmonize solutions.

Another example of a capability which may require negotiation is security capabilities (voice ciphering, data encryption, etc.). This is currently of great interest in public telecommunication networks and will become more so in the near future. However, there are multiple ways of protecting user plane information against unwanted observers. There are multiple ciphering algorithms and data encryption algorithms currently deployed and new ones appearing continuously. Therefore, a way to negotiate security capabilities in public telecommunication networks will be required shortly and this is provided by the present invention.

Figure 3:
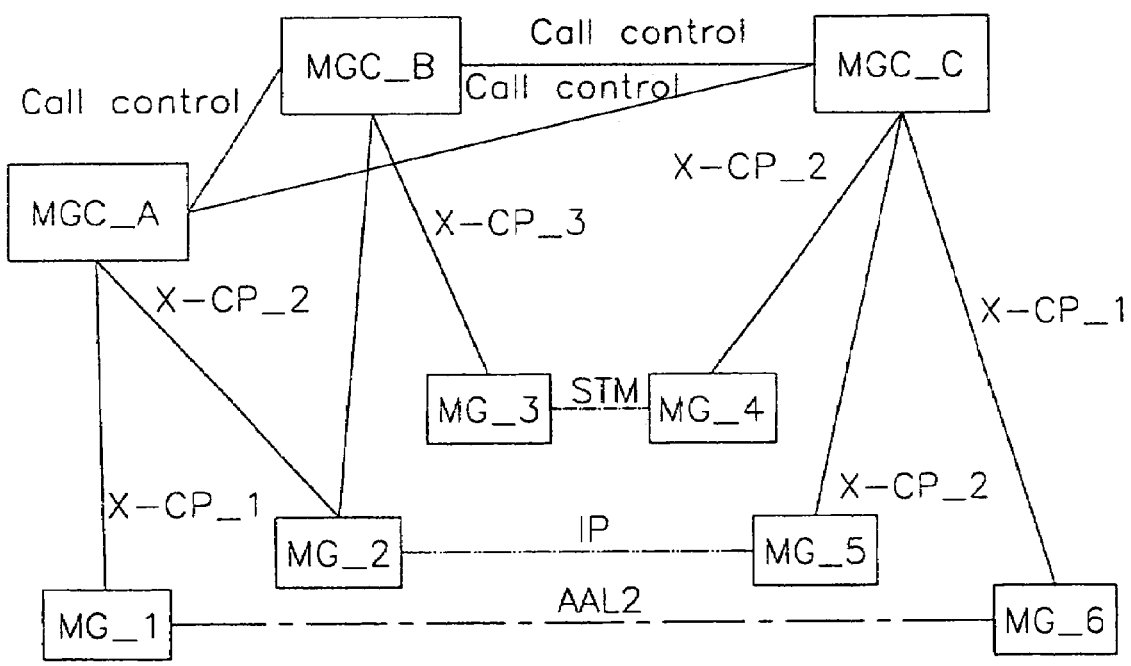
FIG. 3 illustrates a telecommunications network comprising Media Gateway Controllers and Media Gateways.

The above description has referred generally to a BC level and a CC level. FIG. 3 illustrates in more detail a telecommunications system having split CC and BC levels. The CC level comprises a number of Media Gateway Controllers (MGC_A, MGC_B MGC_C) whilst the BC level comprises a number of Media Gateways (MG_1 to MG_6). A first pair of Media Gateways (MG_1, MG_6) provide a bearer connection over an AAL2 network, whilst a second pair of Media Gateways (MG_2, MG_5) provide a bearer connection over an IP network. A third pair of Media Gateways (MG_3, MG_4) provide a bearer connection over an STM network. As is apparent from FIG. 3, each of the Media Gateway Controllers is arranged to control either two or three Media Gateways via an open interface (X-CP_1 to X-CP_3).

As has already been described, capability negotiation takes place at the CC level, i.e. between Media Gateway Controllers. In addition, the X-CPs provide means for the Media Gateways to "inform" their-controlling Media Gateway Controllers of the capabilities and options which the Media Gateways support (e.g. capabilities=compressed speech, options=list of codecs). The X-CPs also provide a means whereby a Media Gateway can be involved in a capability negotiation, thus ensuring that a capability selection is based not only on the capabilities specified for the gateway but also on the current availability of those capabilities. If this were not the case, there is a danger that a Media Gateway might not have the resources to support an option negotiated on its behalf by a Media Gateway Controller. Consider for example the case where a Media Gateway Controller needs to provide an Intelligent Network (IN) service for a call and which requires in-band announcements. If the Media Gateway Controller selects a codec by itself, based on a knowledge of the codecs supported by the Media Gateway, it is possible that the Media Gateway does not currently have available a TRAU for such a codec. The Media Gateway will therefore reject the connection, resulting in a call drop.

To illustrate the solution to this problem, consider the situation where a Media Gateway Controller receives from a peer Media Gateway Controller a connection set-up message containing a list of possible options relating to a specific negotiable capability. The message indicates the level of preference for each option. The receiving Media Gateway Controller reads the received list and removes from the list those options which it knows are not supported by the Media Gateway which has been selected for the connection. The Media Gateway Controller then sends the modified list of options to the Media Gateway over the X-CP interface.

The receiving Media Gateway chooses the option having the highest priority and which the Gateway is currently able to support. The Media Gateway then seizes the resources needed to support this option and communicates the option to the Media Gateway Controller over the X_CP interface. Upon receipt of the selected option, the Media Gateway Controller signals the selection to the peer Media Gateway Controller as described above.

Figure 4:
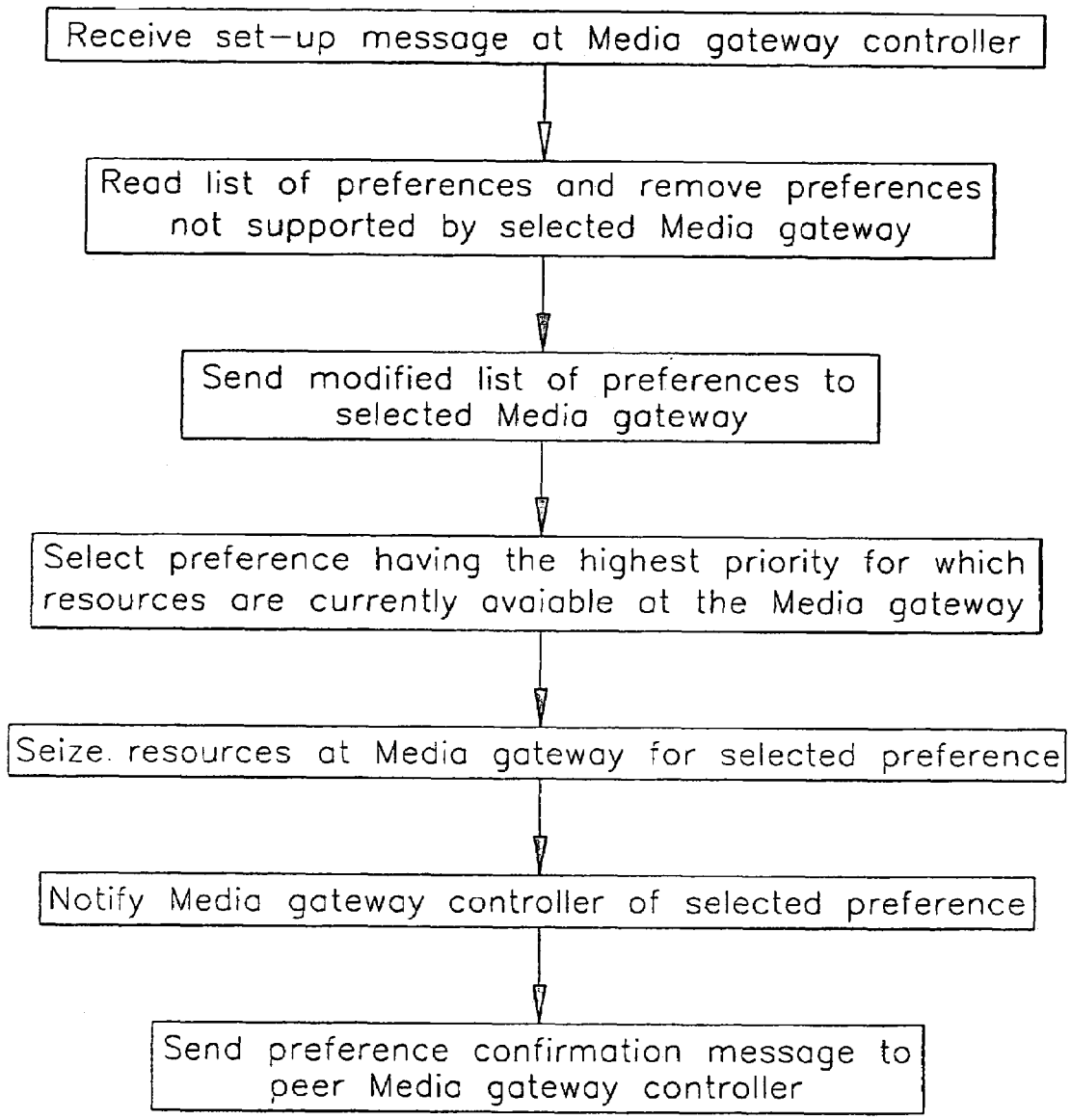
FIG. 4 is a flow diagram illustrating a generic capability negotiation process used in the network of FIG. 3.

The generic capability negotiation process described above is further illustrated by the flow diagram of FIG. 4.

In many countries operators are requested by local authorities to provide interception of calls for legal purposes. In order to enable legal interception, operators usually require full access to user plane data (i.e. the actual speech or other data carried by the so-called "pipe" at the bearer level) for each call inside their networks. With the introduction of TICC, user plane data may be transported over a variety of technologies (e.g. ATM, IP etc.) which allow for the transport of encrypted user plane data. Therefore unless the Legal Intercept point can determine the security and codec (coding and decoding) characteristics of the user plane data the call will not be able to be successfully intercepted. Therefore, the operator needs to know the codecs and encryption (security) algorithms used inside each BC section (between two BC nodes) of a call.

On the other hand, transcoding and translation of security algorithms significantly reduce the quality of service of a call and introduce extra delays. Therefore, it is desirable to reduce the number of (or avoid if possible) transcoding points and translation of security algorithm points required from end to end for each call.

A mechanism for solving this problem will now be described with reference to the sequence of operations shown in FIG. 5. The call control part of Node A (see FIG. 1) transmits a message to the call control part of Node B which includes a list of options supported by Node A, together with a preference level for each such option. Although the mechanism is particularly suited for use in TICC it could also be used in an independent protocol specifically adapted for performing negotiation, and this is indicated in FIG. 5 by the initials UPCN (User Part Capability Negotiation).

The call control part of Node B then sends a message to the call control part of Node C, which includes a list of options supported by both Node A and Node B, together with a preference level for each option. Node C then selects the supported option with the highest preference level, and returns a message to Node B which includes the selected option. Node B in turn sends a message to Node A specifying the selected option.

Figure 5A:
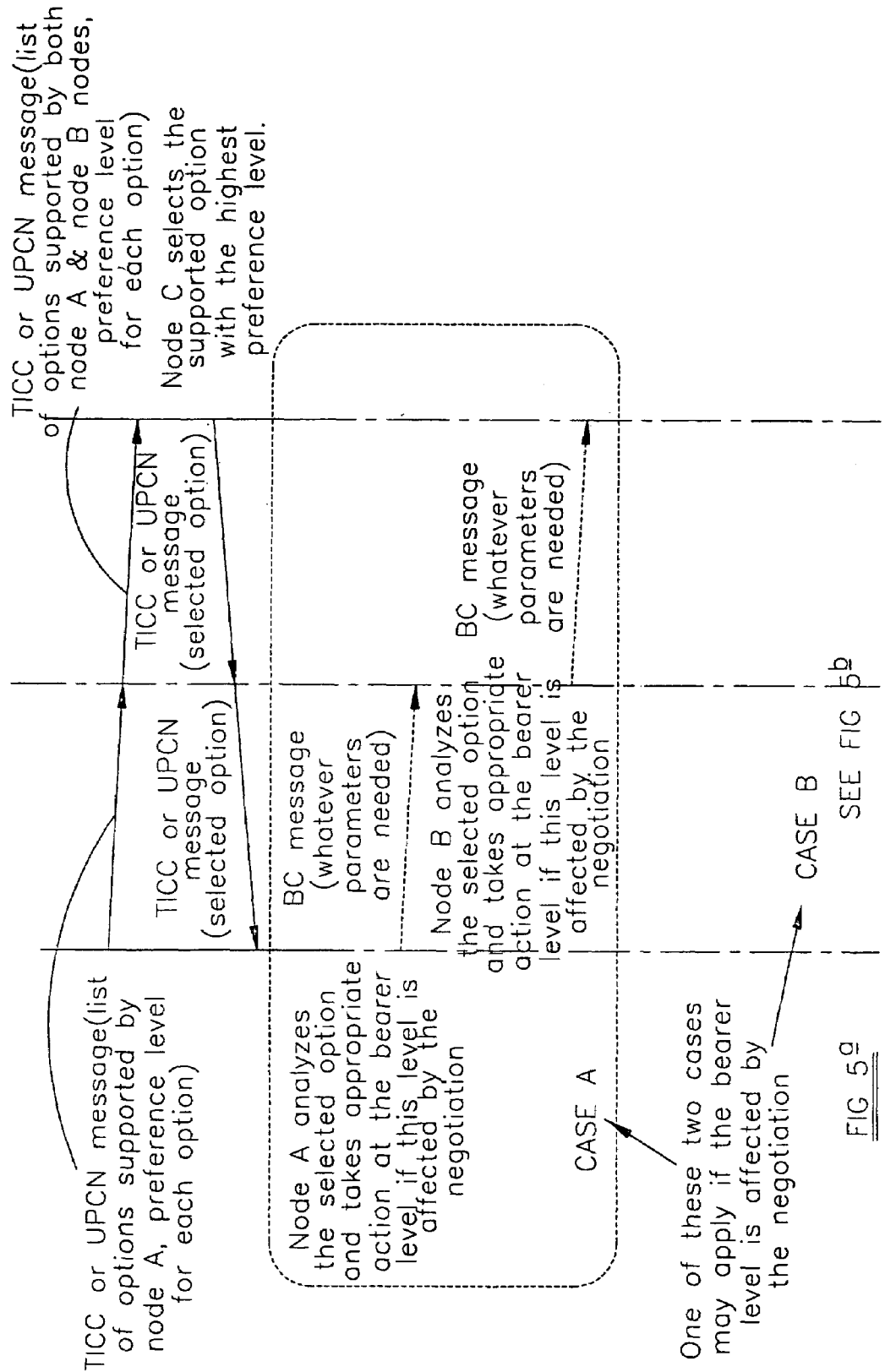
FIG. 5 illustrates signalling flows where an intermediate node is involved in the negotiation between an originating and a terminating node.
Figure 5B:
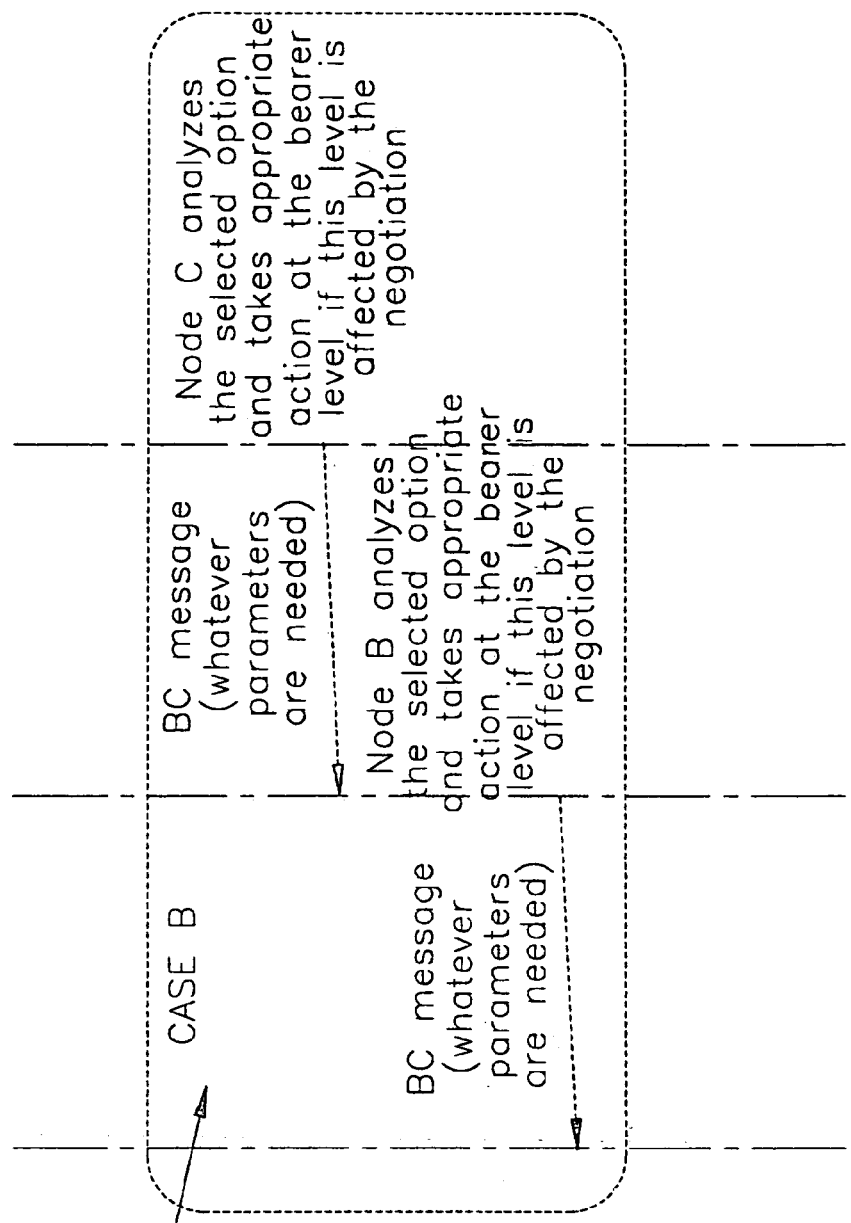

FIG. 5 then shows two possible sequences of operation, labelled case A and case B. In Case A, if the bearer level is affected by the negotiation at the call control level described above, Node A takes appropriate action at the bearer level. For example, it may be necessary for Node A to change the size of the pipe needed to support the selected option. A BC message is then sent from Node A to Node B specifying whatever parameters are needed. Node B then analyses the selected option and takes appropriate action at the bearer level if the bearer level is affected by the negotiation. A BC message is then sent from Node B to Node C specifying whatever parameters are needed for the bearer level between nodes B and C.

In case B the sequence of operations at the bearer level starts at Node C and ends at Node A. Node C analyses the selected option and takes appropriate action at the bearer level, if the bearer level if effected by the negotiation. A BC message is then sent from Node C to Node B specifying whatever parameters are needed. Node B analyses the selected option and takes appropriate action at the bearer level if the bearer level is effected by the negotiation. A BC message is then sent from Node B to Node A specifying whatever parameters are needed.

It should be understood that cases A and B are alternatives, but other cases are also possible. In this regard, it should be appreciated that the BC protocol between nodes A and B can be different from that between nodes B and C, for example the protocols could be ATM and IP respectively. It may be necessary to modify the parameters for the bearer level connection between one pair of nodes, but not between the other pair of nodes.

It should also be appreciated that the negotiation described above can take place during call establishment or during the call itself. The latter may apply, for example, where a user wishes to start using encryption during a call.

This procedure is able to reduce the number of points in the network at which the generic capability needs to be changed. In particular, the mechanism specified above can be used to minimise the number of transcoding points or translation of security algorithm points for end-to-end calls traversing multiple CC sections. The solution applies for calls traversing one or multiple networks.

The GCN mechanism includes having the initiating CC node include the list of options with their preference level and the terminating node select a supported option using the preference levels indicated by the originating node. The aforementioned negotiation mechanism is useful when the negotiation is carried out between two CC nodes only. The proposed adaptation expands the GCN mechanism to cases when more than two CC nodes intervene in the negotiation. That is, cases when the call traverses multiple CC nodes belonging to one or more telecommunication operators. The adaptation involves the following sequence of operations:

1. The initiating CC node sends its list of supported options with the level of preference associated to each one.

2. Transit CC nodes analyse the received list of options, delete unsupported options from the list and forward the list to the next node.

3. The terminating CC node: analyses the received list of options with their associated priorities and selects the supported option with highest indicated priority.

In the case of legal interception it allows the Legal Interception point (i.e. the node at which interception is to take place) to receive the security and coding characteristics of the user plane data to enable successful interception of the call.

With the proposed new architecture of FIG. 1, where the Call Control protocol is independent of the transport mechanism, codec negotiation must be performed by TICC for a call before a user plane transport connection is established for this call. The reason is that the amount of transport resources required to support a call depends on the codec selected for this call (i.e. on the outcome of the codec negotiation procedure). In some cases, a codec is initially selected for a call but, due to a change in circumstances, this codec must be changed for a new codec in a later phase of the call. Two important situations where this arises are the following:

1) Interactions with Intelligent Network (IN) services for the purpose of providing announcements and redirection of calls to a called party either automatically or based on input from the calling party. A first codec must be selected to provide the announcements. Later the call is forwarded/redirected to another party and a second codec is used.

2) Call Forwarding on No-Reply (CFNR) which is a so-called supplementary service. A first codec is negotiated between A and B parties following which the call is forwarded to a C party because B fails to answer in a predefined time. A second codec is required based upon the requirements of party C.

It is recognised that, in both of the cases 1) and 2) above, as well as in other related situations, a call connection must be established over the transport mechanism in dependence upon the first selected codec, to carry announcement, tones, etc. When the codec is subsequently changed, the call connection may need to be modified to support the new codec.

There will now be described with reference to FIG. 6 a signalling process for use in networks using the TICC protocol and which is capable of establishing an end-to-end telephone connection for a speech call, where the call originates from an originating signalling point Node A and is initially directed to a first node Node B or signalling point. The call is subsequently routed to some other terminating signalling point Node C. The illustrated process relates specifically to the invoking of an IN service, where a calling party is initially connected to an IN network node which plays a pre-recorded message to the calling party before routing the call to a final terminating signalling point, or to a CFNR service, where a call is forwarded to a new terminating signalling point after the called party, connected to the initial terminating signalling point, fails to answer the call.

The signalling sequence comprises the following sequential steps:

1. Node A establishes a call to node B. Codec X is selected for this call.

2. A transport connection with appropriate transport resources for the selected codec is set up between nodes A and B.

3. Node B forwards/redirects the call to node C. Node C does not support codec X and selects codec Y.

4. Node B requests Node A to modify the codec choice for this call from codec X to codec Y.

5. If needed, the transport connection between Node A and Node B is modified to suit codec Y. FIG. 6 illustrates both the case where the modification to the transport connection is made in the forward direction and the alternative case where the modification is made in the backward direction.

6. A transport connection suitable for codec Y is established between Nodes B and C.

7. TICC completes the call establishment (TICC ACM+ TICC ANM).

TICC is ISUP based, therefore the signalling message names are taken from ISUP. However, ISUP does not include codec negotiation or codec modification procedures so a new pair of TICC messages (TICC modify request/confirm) is needed to provide codec modification capabilities.

Figure 6A:
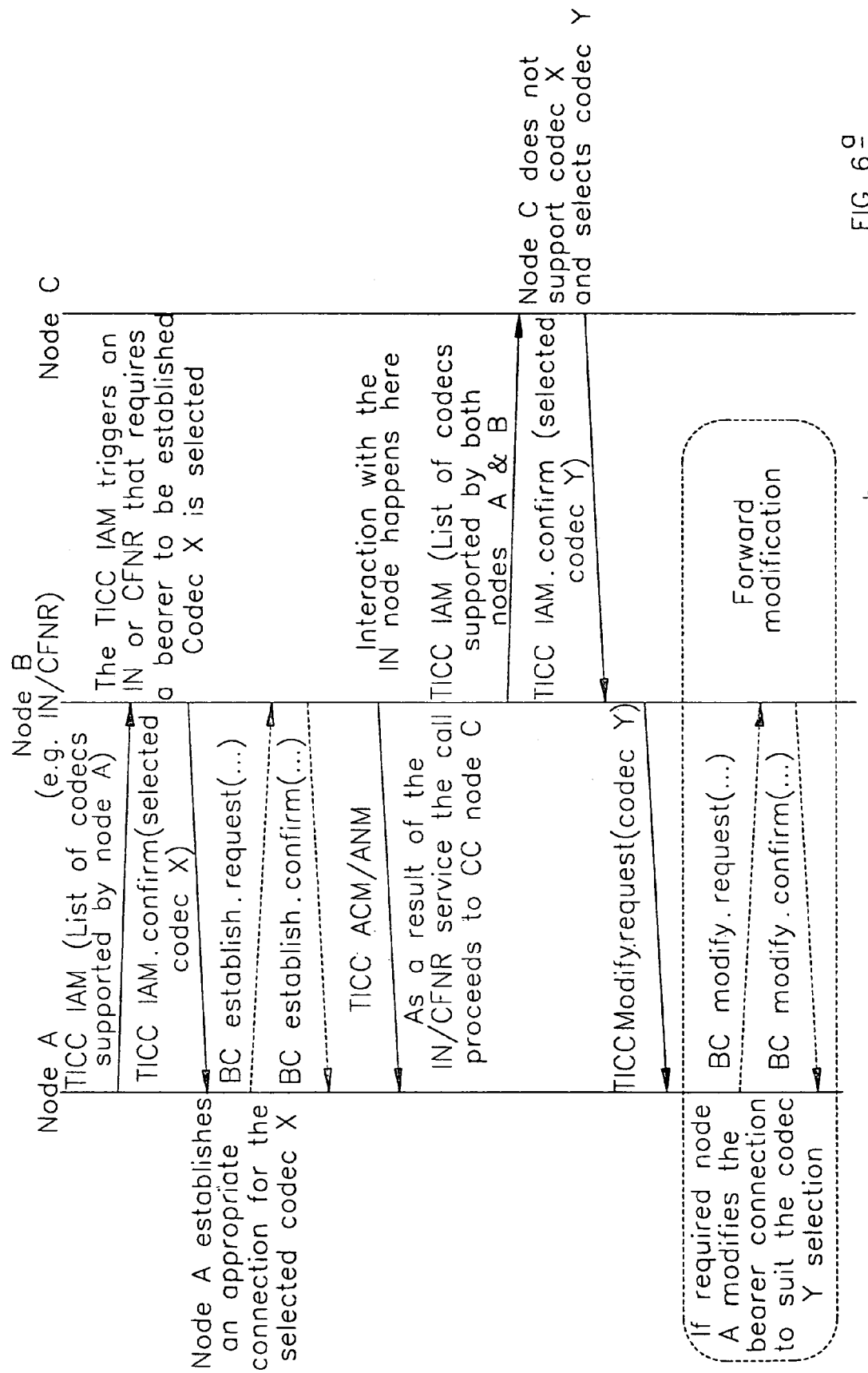
FIG. 6 illustrates a further set of signalling flows where an intermediate node is involved in the negotiation between an originating and a terminating node.
Figure 6B:
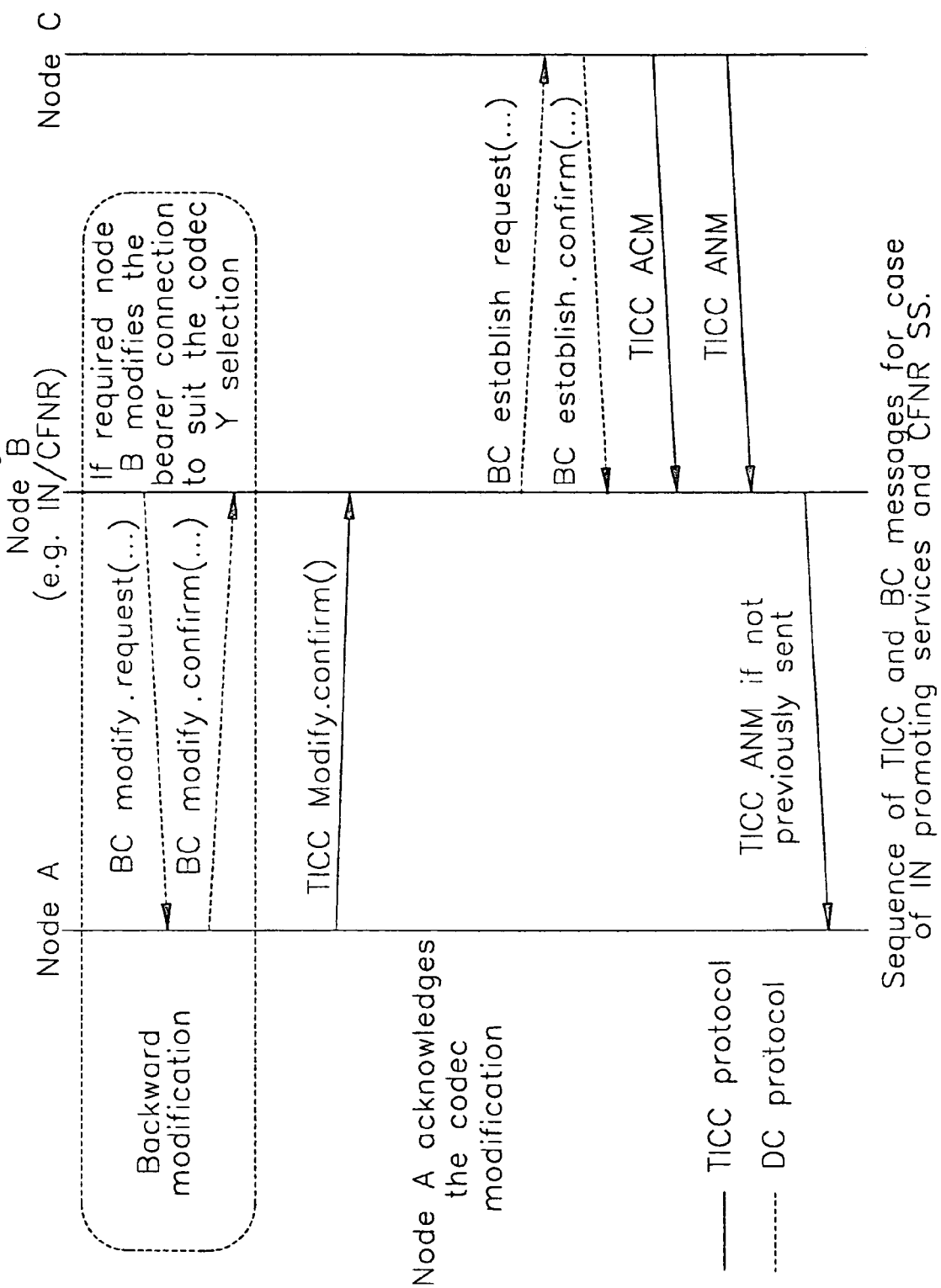

It will be appreciated that, whilst FIG. 6 illustrates only that the modification made to the Node A to Node B transport connection may be made in either the forward or the backward direction, other transport connection modifications may also be made in either the forward or the backward direction. Also, the transport connections may be established in either the forward or backward direction.

The mechanism described may be employed to establish a speech call connection between more than three signalling points or nodes. For example, one or more transit nodes may be present between the originating signalling point Node A and the original terminating signalling point Node B and/or between the original terminating signalling point Node B and the final terminating signalling point Node C. It will also be appreciated that the call may be further transferred or relayed from Node C to yet another signalling point (i.e. a Node D). This would involve a negotiation to determine whether codec Y is suitable for Node D, and if not a possible modification to the transport connection between Node A and Node B and between Node B and Node C. This process may be extended to any number of nodes.

Conventional Public Switched Telephone Networks (PSTN) digitally encode speech data for transmission using Pulse Code Modulation (PCM). On the other hand, digital mobile telephone networks make use of more advanced coding techniques such as CELP and Adaptive Multi-Rate (AMR) coding, which achieve higher compression ratios than can be achieved with PCM. In many mobile networks, coding and decoding of speech is carried out at the mobile terminals themselves. Providing that a call is made between two mobile terminals both registered with the same network it may be possible to transmit encoded speech data from end to end.

In the event that a call is from a mobile terminal registered with a mobile network, to a terminal which is a subscriber of a "foreign" network, end to end transmission of encoded speech data may not be possible, depending upon the nature of the foreign network and of any intermediate networks which connect the originating mobile network to the foreign network (the same will of course be true where the call originates at the foreign network).

Figure 7:
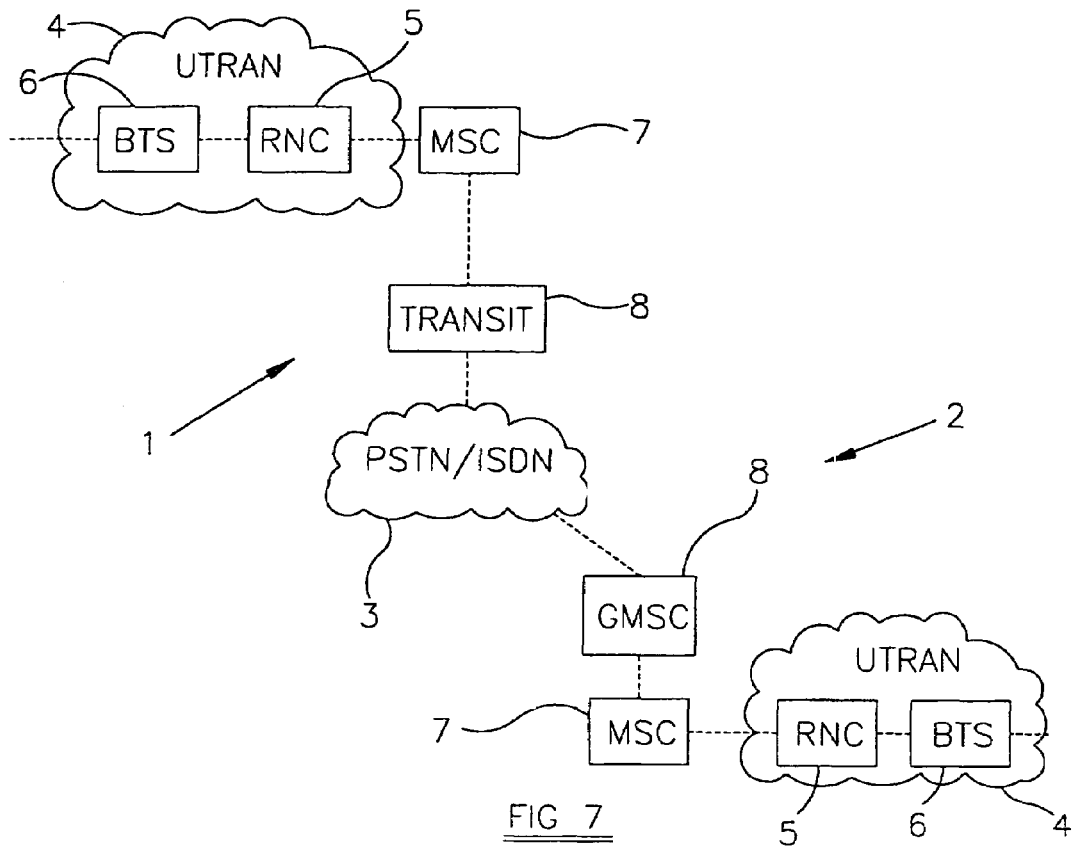
FIG. 7 illustrates schematically a telecommunications system of known design.

Consider the telecommunications system of FIG. 7 which illustrates two third generation Universal Mobile Telecommunication System (UMTS) networks 1,2 which are coupled via a conventional PSTN/ISDN network 3. The UMTS networks 1,2 each comprise a UMTS Terrestrial Radio Access Network (UTRAN) 4 having Radio Network Controllers (RNCs) 5 and Base Transceiver Stations (BTSs) 6. A UTRAN 5 passes compressed speech data between a mobile terminal (not shown) and a Mobile Switching Centre (MSC) 7 which routes incoming and outgoing call connections.

Assume that a call originates from a subscriber of one of the UMTS networks 1 and is made to a subscriber of the other of the UMTS networks 2. The call is routed via the PSTN 3 using respective Transit nodes 8—one of which is a Gateway MSCs (GMSCs)—of the UMTS networks 1,2. As has already been noted, the PSTN 3 uses PCM to encode speech data. Now it is important that any speech data transferred through the PSTN 3 is in a form which can be understood by that network. This is necessary, for example, to allow the PSTN 3 to insert operator announcements into a speech call, to perform voice prompting services, etc, as well as to allow the operator of the PSTN 3 to monitor call, e.g. for security purposes. It is therefore necessary to "transcode" speech data at the GMSCs 8 of the UMTS networks 1,2 prior to passing the data to the PSTN 3, i.e. the speech data is converted from a mobile network speech coding format to PCM. Similarly, PCM data received at the GMSCs 8 must be converted to the appropriate mobile network speech coding format Transcoding consumes considerable processing resources at a GMSC 8 and also results in a perceivable degradation in speech quality. In order to at least partially overcome these disadvantages, Tandem Free Operation (TFO) devices may be introduced into the speech connection at the GMSCs 8. Outgoing speech data continues to be converted to PCM, but the least significant bits of each PCM sample are "stolen" by the TFO device. The stolen bits form a channel which has sufficient bandwidth (i.e. 8 Kbits/sec) to carry the original coded data. The TFO device at the terminating UMTS network reassembles the coded data for forwarding to the associated UTRAN whilst the received PCM data is discarded (unless it has been modified by the PSTN, e.g. by the addition of an operator announcement). In this way, TFO makes PCM data available to the PSTN 3, whilst still allowing the end to end transmission of efficiently coded speech data.

In the event that intermediate devices within the PSTN/ISDN alter the PCM bit stream, the TFO devices detect the change and "fall-back" to passing the PCM coded speech between the TFO devices, i.e. they no longer pass on the compressed voice data.

The speech codecs available to a mobile network depend upon the nature of the network and possibly upon the nature of a terminal using the network. It will be apparent that the end to end use of a single codec is only possible when two networks are both capable of using the same codec. Assuming that the GMSCs of two mobile communication networks are aware of the codec capabilities of the networks to which they belong, it is possible for them to negotiate and agree upon a common codec. Indeed, a suitable protocol is provided for in the ETSI recommendation GSM 08.62 (version 7.0.0, release 1998).

A problem arises in attempting to implement TFO in mobile networks such as are illustrated in FIG. 7, where the TFO devices are located on the fringe of the mobile networks, i.e. outside of the UTRAN (conventionally TFO devices are located within the radio access networks). There is currently no mechanism for exchanging information, concerning codecs negotiated between TFO devices, between TFO devices and radio access networks, in such networks.

Figure 8:
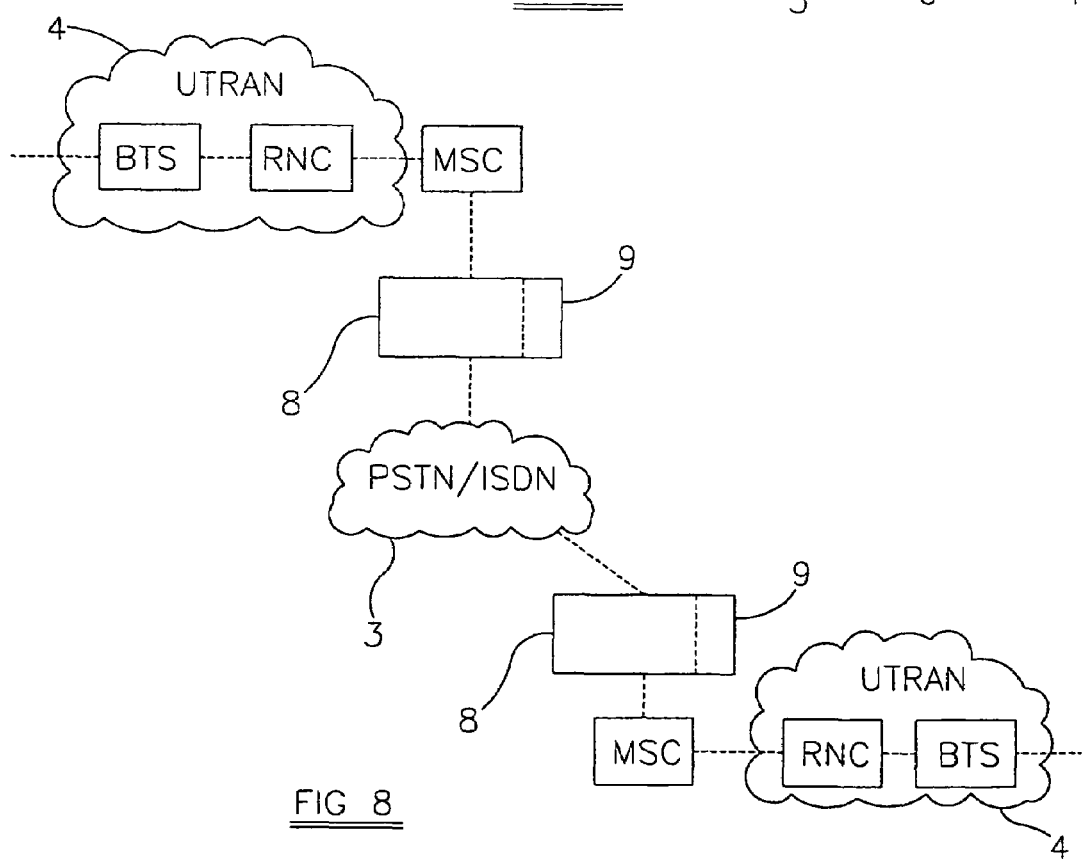
FIG. 8 illustrates schematically a telecommunications system.
Figure 9:
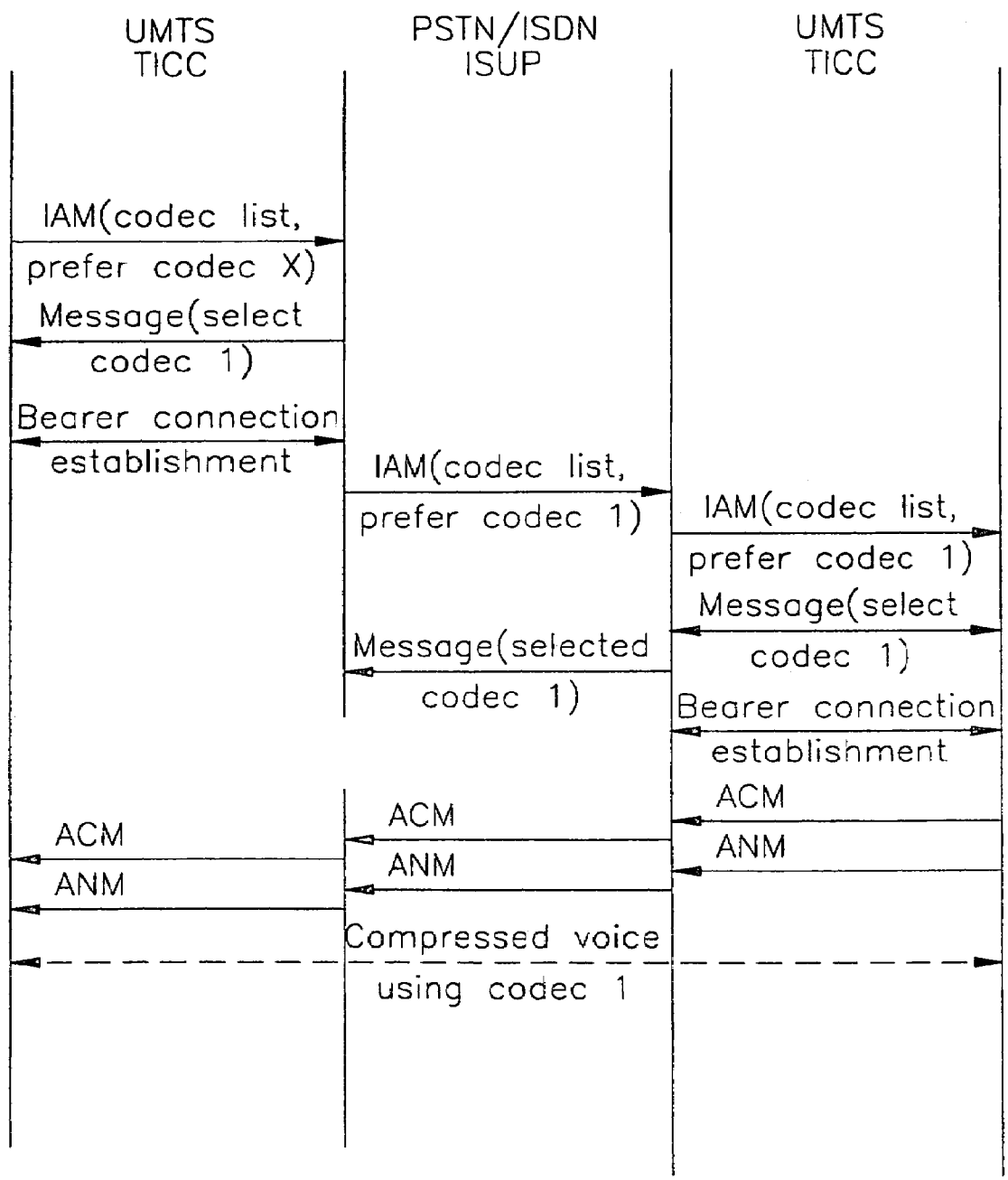
FIG. 9 illustrates a first set of signals associated with codec negotiation in the system of FIG. 8 and according to a first embodiment of the present invention.

FIG. 8 illustrates a modified system architecture in which the GMSCs of the two UMTS networks have incorporated thereinto TFO devices 9, whilst FIG. 9 illustrates signalling associated with call set-up between two nodes in respective UMTS mobile telephone networks. Nodes 1 and 4 represent MSCs, whilst the two middle Nodes 2 and 3 represent GMSCs.

Call set-up signalling within the UMTS networks is conducted at the Call Control (e.g. TICC) level, call set-up being initiated by an Initial Address Message (IAM) sent from an MSC to the associated GMSC. This IAM uses a Generic Capabilities Negotiation (GCN) mechanism to determine a number of parameters for the call connection. In particular, the IAM contains a list of codecs supported by the originating UMTS network, as well as the preferred codec. The originating side GMSC selects a codec from the transmitted list of codecs, and signals its selection back to the MSC in the Message (Selected Codec 1). Subsequently, a call connection is established at the bearer level (e.g. AAL2 or IP) with sufficient bandwidth to support the selected codec.

To enable end-to-end codec negotiation it is proposed to add the GCN to the ISUP protocol. This end-to-end codec negotiation will maximize the possibility of the end points utilizing the same codec type. If the end points use the same voice encoding algorithm, TFO is able to pass the compressed voice through the PCM network without degrading the voice quality due to unnecessary transcoding. This also enables transmission savings by minimizing the bearer requirements within the originating and terminating networks that support compressed voice (e.g. AAL2 or IP bearer transport).

FIG. 9 illustrates the use of GCN enhanced ISUP messages to bridge the signalling "gap" between the two UMTS networks. At the terminating UMTS network, an IAM is sent using TICC from the GMSC to the MSC. The MSC in this case accepts use of codec 1 and signals this back to the GMSC again using TICC. Subsequently, the bearer level connection is established at the terminating UMTS network. The PSTN relays the codec acceptance to the originating side GMSC. As the originally proposed codec has been accepted, there is no need to change the bearer level connection at the originating UMTS network. However, if there is a change in the codec, this must be sent from the originating side GMSC to the MSC, so that the bearer level connection can be modified, e.g. to increase the bandwidth of the connection. In FIG. 9, ACM indicates an Address Complete Message and ANM indicates an Answer Message.

Figure 10:
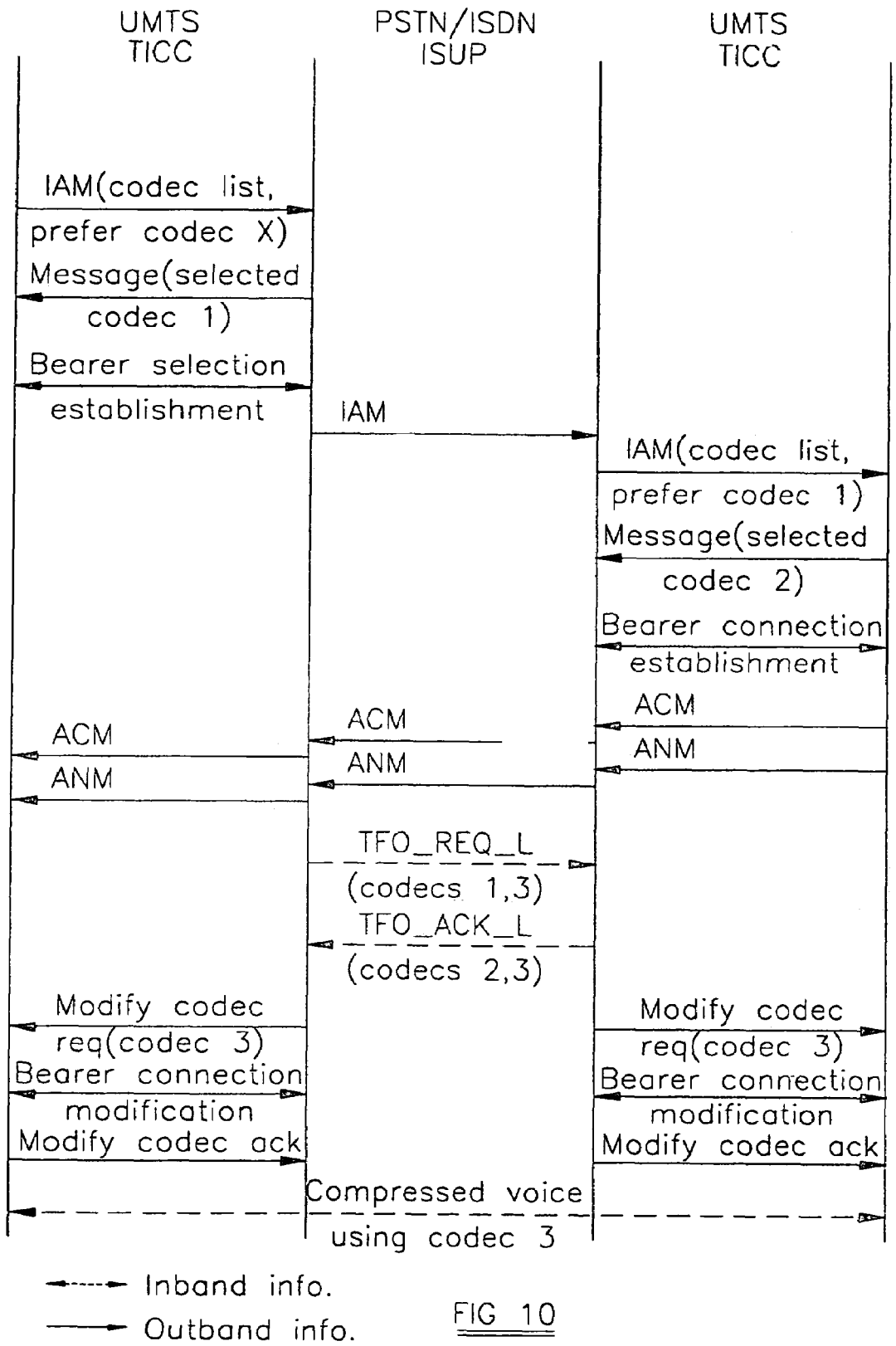
FIG. 10 illustrates a second set of signals associated with codec negotiation in the system of FIG. 8 and according to a second embodiment of the present invention.

FIG. 10 illustrates a second embodiment of the invention. This solution relies on the optional Codec Mismatch Resolution and Optimisation procedure in the TFO protocol to detect incompatible codecs. When TFO detects codec incompatibility, it can trigger a Codec modification procedure to modify the codec used by the terminals. TFO specifies the rules for resolving codec mismatch (i.e. which codec to select). The TFO protocol then triggers the TICC signalling to modify the codec used on the call, to enable compatible codecs in the two end terminals. A change from the codec initially suggested by the originating UMTS network may require a modification to the bearer level connection established in either UMTS network.

The embodiments described above minimise unnecessary speech transcoding due to intermediate PCM networks as well as allowing for the optimal allocation of user plane equipment (e.g. transcoding units) and/or user plane resources (e.g. bandwidth) to support the service level of a particular call in public telecommunication networks.

Negotiation of the codec type will be required in existing networks and new networks that support only PCM encoded voice in order to minimize unnecessary transcoding in the speech path. The UMTS and GSM subscriber's speech quality will not be degraded unnecessarily when their calls traverse existing PCM core networks having TFO support. When the GCN mechanism is introduced into the TICC protocol, it is likely to be carried in a transparent method (APM User).

It will be appreciated by the person of skill in the art that various modifications may be made to the above described embodiments without departing from the scope of the present invention.

The invention claimed is:

1. A method of negotiating protocol options between first, second and third nodes in a telecommunications network using separated call control and bearer control protocols, the method comprising the steps of:
    transmitting a first call control message from the first node to the second node specifying protocol options supported by the first node;
    transmitting a second call control message from the second node to the third node specifying protocol options supported by both the first and second nodes;
    if there is a protocol option supported by both the first and second nodes, selecting a protocol option from the protocol options specified in the second control message, wherein said step of selecting a protocol option from the protocol options specified in the second control message is carried out by the third node; and
    if there is not a protocol option supported by both the first and second nodes, selecting a default capability.

2. A method according to claim 1, wherein the protocol option is one selected from the group consisting of speech codecs and security capabilities.

3. A method according to claim 1, wherein each said call control message includes a preference level associated with each specified protocol option.

4. A method according to claim 1, wherein the first node is an originating node.

5. A method according to claim 1, wherein the third node is a terminating node.

6. A method according to claim 1, which further includes determining whether the bearer level between the first and second nodes is affected by said selecting step, and if the bearer level is affected taking action to modify the parameters of the bearer level between the first and second nodes.

7. A method according to claim 1, which further includes determining whether the bearer level between the second and third nodes is affected by said selecting step, and if the bearer level is affected taking action to modify the parameters of the bearer level between the second and third nodes.

* * * * *